(12) United States Patent
Moura Bordado et al.

(10) Patent No.: US 8,414,809 B2
(45) Date of Patent: Apr. 9, 2013

(54) STOPPERS OF COMPOSITE CORK MATERIAL FOR SPARKLING WINES AND THE PROCESS FOR THEIR PRODUCTION

(75) Inventors: Joao Carlos Moura Bordado, Lisboa (PT); Jaime Noto, Fiaes VFR (PT); Antonio Manuel De Magalhaes Moreira Bastos, Fiaes VFR (PT)

(73) Assignees: Pietec-Corticas, S.A., Fiaes VFR (PT); Istituto Superior Tecnico, Lisboa (PT)

( * ) Notice: Subject to any disclaimer, the term of this patent is extended or adjusted under 35 U.S.C. 154(b) by 0 days.

(21) Appl. No.: 13/335,786

(22) Filed: Dec. 22, 2011

(65) Prior Publication Data

US 2012/0091616 A1 Apr. 19, 2012

Related U.S. Application Data

(62) Division of application No. 12/441,990, filed as application No. PCT/PT2007/000033 on Jul. 26, 2007.

(30) Foreign Application Priority Data

Oct. 17, 2006 (PT) .......................................... 103591

(51) Int. Cl.
*B29C 45/16* (2006.01)
*B65D 39/00* (2006.01)
(52) U.S. Cl. .......................... 264/113; 264/115; 215/364
(58) Field of Classification Search .......................... None
See application file for complete search history.

(56) References Cited

U.S. PATENT DOCUMENTS

| 1,576,242 | A | 3/1926 | McManus |
| 3,549,472 | A | 12/1970 | King et al. |
| 3,821,135 | A | 6/1974 | King |
| 4,042,543 | A | 8/1977 | Strickman et al. |
| 4,521,266 | A | 6/1985 | Careddu |
| 5,317,047 | A | 5/1994 | Sabate et al. |

(Continued)

FOREIGN PATENT DOCUMENTS

| DE | 1 642 178 A1 | 6/1971 |
| EP | 1 270 703 A2 | 1/2003 |

(Continued)

OTHER PUBLICATIONS

12441990—ES1043200U Machine Translation.doc, May 1999, pp. 1-6.

*Primary Examiner* — Mary F Theisen
(74) *Attorney, Agent, or Firm* — Sughrue Mion, PLLC

(57) ABSTRACT

Stoppers made from composite material for sparkling wines consisting of two types of cork agglomerate which are closely bonded and produced from two ranges of granulates of different granulometry, where the joining surface between the two agglomerates is irregular due to their interpenetration. A production process of such stoppers by individual molding (piece by piece), where there is simultaneous feeding of two types of granulate and respective additives into a mold. The mold is then closed and the material compressed and heated for an appropriate time for polymerization. The granulates used are normally treated with a reactive agglomerant consisting of, for example, quasi-prepolymer based on TDI or quasi-prepolymer based on MDI base. After de-molding, the unfinished stopper is stabilized, and later machined to the final dimensions.

20 Claims, 3 Drawing Sheets

U.S. PATENT DOCUMENTS

| | | |
|---|---|---|
| 6,152,966 A | 11/2000 | Conrad et al. |
| 6,601,722 B1 | 8/2003 | Litoux-Desrue et al. |
| 7,595,014 B2 | 9/2009 | Pinto Coelho et al. |
| 7,993,743 B2 | 8/2011 | Taylor |
| 2003/0114626 A1 | 6/2003 | Franken et al. |
| 2004/0178168 A1 | 9/2004 | Matheson |
| 2008/0078737 A1 | 4/2008 | Brennan et al. |
| 2008/0229569 A1* | 9/2008 | Romao de Sousa ............ 29/525 |
| 2011/0226722 A1* | 9/2011 | Romao de Sousa .......... 215/362 |

FOREIGN PATENT DOCUMENTS

| | | |
|---|---|---|
| ES | 1 043 200 U | 5/1999 |
| ES | 1 057 788 U | 9/2004 |
| GB | 517798 A | 2/1940 |

* cited by examiner

STOPPERS OF COMPOSITE CORK MATERIAL FOR SPARKLING WINES AND THE PROCESS FOR THEIR PRODUCTION

This is a divisional of application Ser. No. 12/441,990 filed Mar. 19, 2009. The entire disclosure of the prior application, application Ser. No. 12/441,990, as well as the content of Portugal Patent Application PT103591 from which priority has been claimed in the prior application, is considered part of the disclosure of the accompanying Divisional application and is hereby incorporated by reference.

FIELD OF THE INVENTION

This invention is about cork stoppers of composite material for sparkling wines, consisting of two types of cork agglomerate, closely bonded and produced from two ranges of granulates of different granulometry, as well as with the preparation of the referred to stoppers using two mixers and individual moulding of the cork agglomerate stoppers.

BACKGROUND TO THE INVENTION

The world market for sparkling and gassy wines is in full expansion and already exceeds two billion bottles per year produced in more than 50 countries. One of the essential aspects, which is of crucial importance, is the correct and safe sealing of this type of bottle.

In fact, in the case of champagne and sparkling or gassy wine, the sealant has to guarantee the seal in such a way as ensure that pressure inside the bottle is maintained. For sparkling wines the pressure inside the bottle is in excess of 1.5 bar.

The demands of the sparkling wines market are many and specific, with the most important of them being; the homogeneity of performance (sealing, ageing, behaviour after being opened and preservation of the organoleptic characteristics), acceptance by the market (traditional appearance of the cork in the shape of a mushroom) and high quality in relation to cost.

The market currently prefers the use of cork sealants and these now account for 80% of that, with the remaining 20% taken up by synthetic sealants and screwcaps.

The cork sealants currently used can not meet all the demand.

Cork agglomerate stoppers are currently produced by two distinct processes:
  By continuous reactive extrusion, also known as the "extrusion process"
  By compacting-reaction in a closed mould, also known as "individual moulding process".

In the first of these processes, the granulated cork, previously moistened with the prepolymer additive is continuously compressed through a heated tubular segment. Compacting induces the filling in of the spaces between the granules with prepolymer additive, which under temperature polymerises the edges of the agglomerated granulation. The continuous cylindrical rod produced in this way is subsequently sectioned off into pieces of suitable length. After the finishing operations have been applied, a stopper with the required length and diameter is obtained.

In the second of these processes, the granulated cork, having been previously moistened by the prepolymer additive, is fed in a semi-continuous way into the cylindrical moulds. The granulation is then compacted in the moulds by two cylindrical pistons. The pressure applied for several minutes in the hot mould allows polymerisation reaction to reach a high level of transformation, typically more than 95%, and so reduces dilatation following removal from the mould.

There are two other processes which are not described as they are considered to be irrelevant; namely tubular centrifuged agglomerate and paralellepipedic blocks.

The agglomerated stoppers with a diameter of between 25 mm and 30.5 mm are the result of the agglomeration of cork granules (measuring between 2 and 8 mm) and of a combination of chemical additives by means of an extrusion process, used, to take an example, in the process registered in the British patent GB 517798 or, less frequently, in the individual moulding process.

The quality of these stoppers is generally considered to be inferior to that desired, due to either the manufacturing process or to the raw materials chosen, in response to the pressures of competition.

Using these stoppers can lead to random ageing of the organoleptic characteristics of the wines, and also to unreliable behaviour in preserving the $CO_2$.

The stoppers which are used most to seal bottles of gassy or sparkling wines are those consisting of a cylinder of agglomerated cork, with two discs of natural cork bonded onto each of the ends.

The agglomerated cylinders are obtained by agglomeration of cork granulates with the average sizes of the granules of between 2 and 8 mm, together with chemical additives, and by means of a reactive extrusion process or by moulding.

The cork discs can therefore be used in the traditional manner or as described in the patent EP 0481155. Bonding by gluing two materials with different physical characteristics whereby one of them undergoes intrinsic variability and heterogeneity of a natural material, and which leads to a not entirely satisfactory homogeneity of behaviour.

The "new generation" agglomerate corks are obtained by agglomeration of cork granulation through a moulding process, and have a minimum weight of 51 percent of granulated cork, with a granulometric measure of between 0.25 and 8 mm, and more frequently between 0.25 and 2.5 mm.

These stoppers are prepared by processes which aim to improve organoleptic neutrality of ageing and may contain expandable synthetic materials as described in European patent EP 0496687. In accordance with the processes used, these stoppers can probably fulfil the usage requirements, namely in regard to homogeneity of mechanical and organoleptic behaviour. However, the visual aspects of the cork, in general, do not meet the expectations of potential customers.

Spanish Patent ES2160005 (Martin) describes an agglomerate stopper with or without glued cork discs and a wire frame. There is only one type of agglomerate, and in this case the cork discs are glued and not bonded closely during moulding (the bonding surface is regular). Neither the preparation process is described nor claimed.

Spanish Utility Model ES1043200 (Emporda) describes a stopper formed of three separate parts: The first is of rough agglomerate (4 to 8 mm), the second of natural cork and the third of fine agglomerate (20.5 to 3 mm). The agglomerate parts are obtained separately by extrusion in unit moulds or in blocks. The parts are glued and not closely bonded during moulding (the bonding surface is regular).

Spanish Utility Model ES1047917 (Emporda) is similar to the Spanish Utility Model ES1043200 and also describes a stopper formed of three separate parts: The first is of rough agglomerate or with impermeabilising agent, the second is of natural cork and the third of fine agglomerate with impermeabilising agent. The parts are glued and not closely bonded during moulding (the bonding surface is regular). The preparation process is not described.

Spanish Utility Model ES1057788 (Rutllant) describes a stopper formed of two or three separate parts: The first is of rough agglomerate (2.72 to 4.75 mm), the second is of fine agglomerate (<1 mm) and the third, if there is one, is of natural cork. The parts are glued and not closely bonded during moulding (the bonding surface is regular). The preparation process is not described.

Spanish Utility Model (Trefinos) describes a stopper formed of an inner cylindrical core of rough agglomerate (3.5 mm) and an outer ring of fine agglomerate (0.5 mm). This product is obtained by extrusion, based on two concentric draw frames.

Spanish Patent ES2255389 (Janosa) describes a stopper consisting of fine agglomerate and a disc of natural cork. The process of fabricating this stopper is by a mixture of the components of the agglomerate and incorporates the disc of cork during the moulding. However the stopper does not have rough agglomerate and has a cork disc, with the bonding surface being regular. The process uses just one mixer.

German Utility Model DE 201 19 241 U1 and German Patent 1936646 describe stoppers which consist of two parts of natural cork separated by a impermeabilising disc of plastic material.

Patent Request WO 2006/003284 describes stoppers of agglomerate cork of just one type with two discs of natural cork glued to the same face of the agglomerate, with the bonding surface being regular, as well as the process of fabrication.

French Patent Request 2 838 714 describes stoppers for sparkling wines of agglomerate cork of just one type, which also has a glued disc of natural cork, with the bonding surface being regular.

SUMMARY OF THE INVENTION

Figure 1:
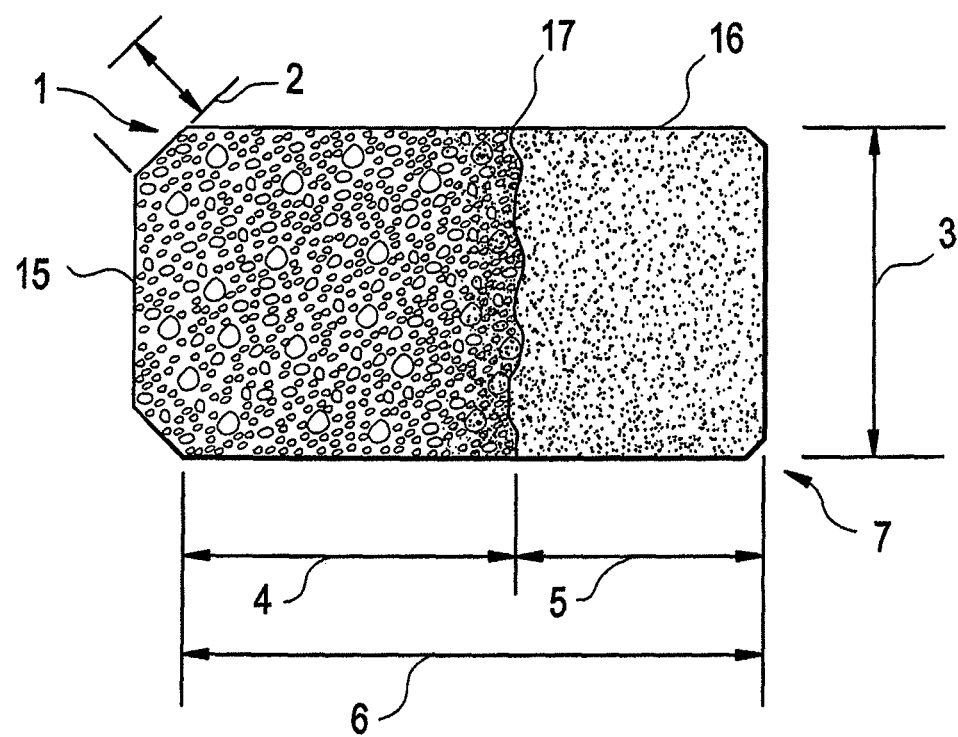
FIG. 1 shows a longitudinal cut to the first model of making the invented stopper, which has a length (6) of 38 to 55 mm, preferably 40 to 48 mm, and a diameter (3) of 23 to 32 mm, preferably between 26 and 31 mm, and consists of a rough agglomerate of cork of length (4) 4 to 45 mm, preferably between 20 and 30 mm, with a bevel (1) of 2 to 8 mm, preferably 3 to 5 mm, which makes an angle (2) with the longitudinal axis of the stopper of 45°±20°, preferably 45°±5°, and of a fine agglomerate of cork of length (5) between 4 and 45 mm, preferably between 15 and 25 mm, with a small bevel (7) of 0.5 to 5 mm, preferably between 0 and 2.5 mm.
Figure 2:
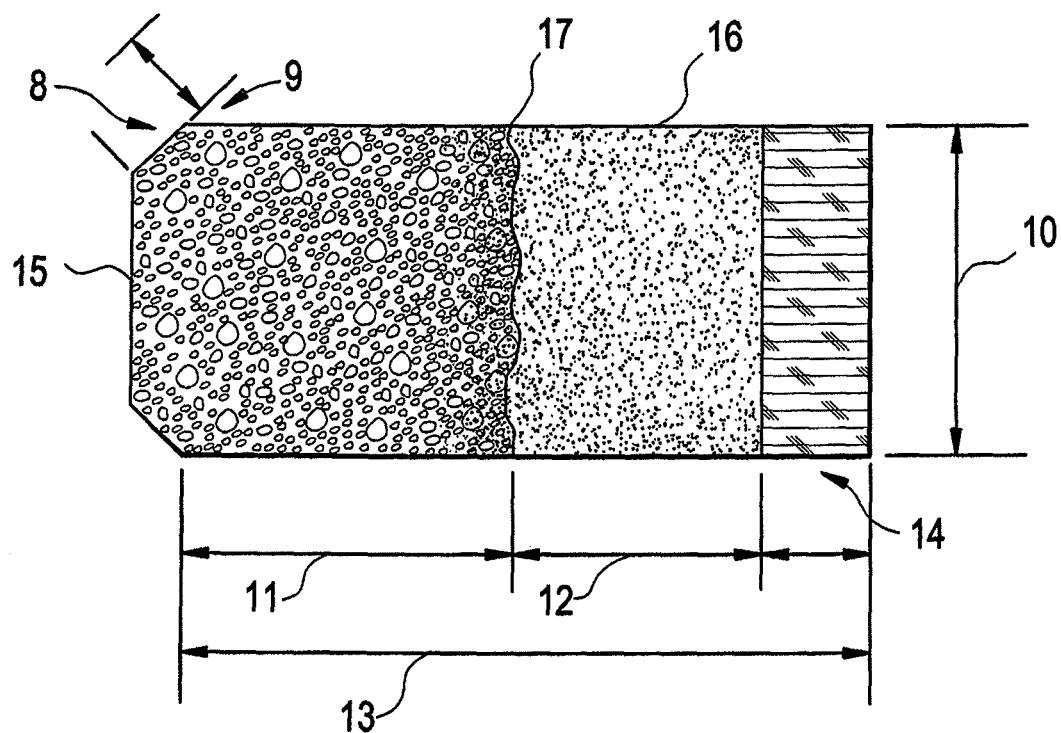
FIG. 2 shows a longitudinal cut in the second model of fabrication of the invented stopper which has a length (13) of 38 to 55 mm, preferably between 40 and 48 mm, and a diameter (10) of 23 to 32 mm, preferably between 26 and 31 mm, and consists of a rough agglomerate of cork of length (11) of 4 to 45 mm, preferably between 20 and 30 mm, with a bevel (8) of 2 to 8 mm, preferably 3 to 5 mm, which makes an angle (9) with the longitudinal axis of the stopper of 45°±20°, preferably 45°±5°, and a fine agglomerate of cork of length (12) of 4 to 45 mm, preferably between 15 and 25 mm, and a disc of natural cork of thickness (14) of 2 to 6.5 mm, preferably 4 to 6 mm.
Figure 3:
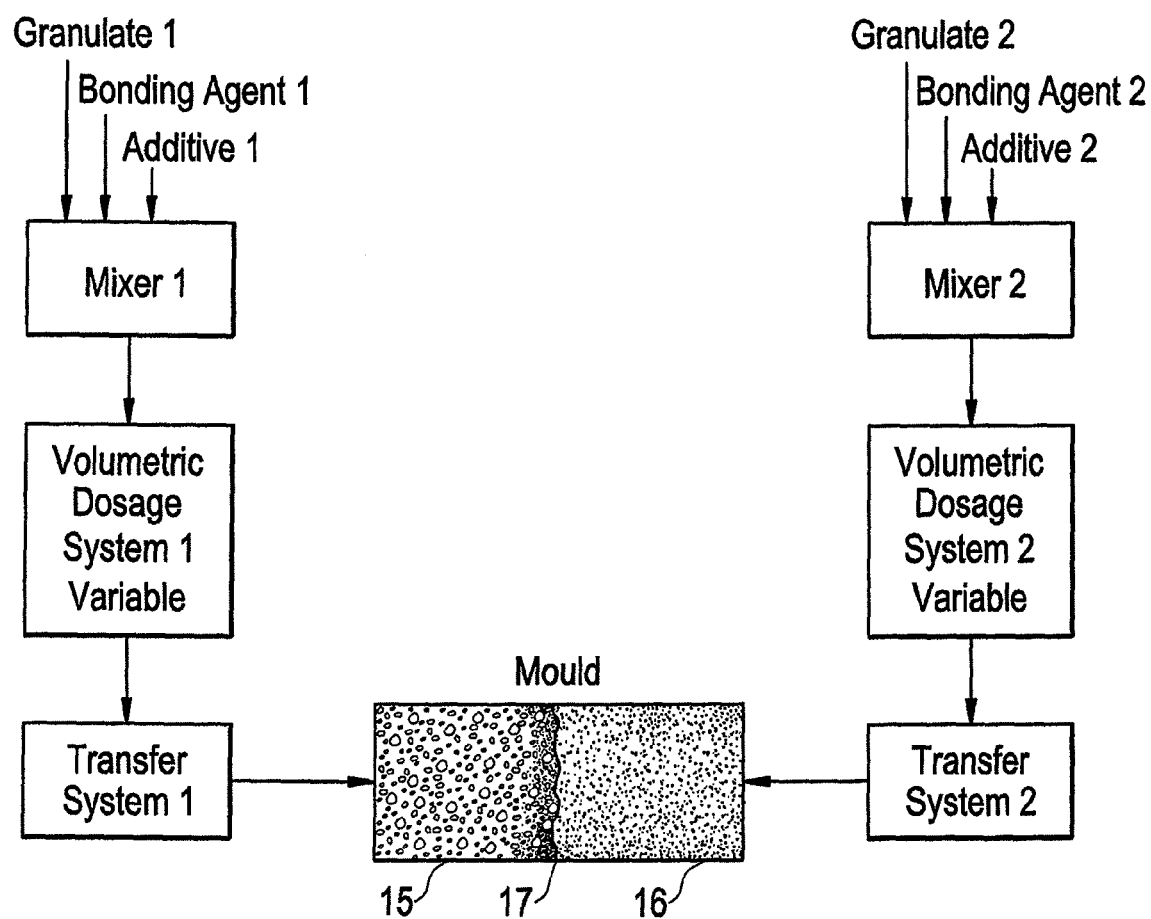
FIG. 3 shows the fabrication diagram of the unfinished stoppers, which will later undergo a finishing process to obtain the final product of the stoppers.

This invention is for making cork stoppers of composite material for sparkling wines, consisting of two types of cork agglomerate with complementary characteristics to meet the demands of the market.

The invention is also about the process of preparation of the referred to stoppers using two mixers and individual moulding of the stoppers of cork agglomerate.

Various methods of connecting the two types of agglomerate were tested in the laboratory, especially the top to top gluing, using different types of glues (polyurethane glues, "hot-melt" glues and reactive "hot-melt" glues, and casein). In every case the glue line is noticeable.

These tests led to satisfactory results, but also led to the conclusion that there is a high risk of not spreading the surfaces with the glue and consequent rupture along the glue line, as well as a high additional cost of the operations subsequent to the moulding.

Because of these observations the process of "Individual Moulding" was decided upon. In this process bonding of two types of granulation takes place in the same moulding operation.

DETAILED DESCRIPTION OF THE INVENTION

A first object of the invention relates to stoppers made of composite material for sparkling wines in bottles at pressure of more than 1.5 bar, with a resistance to rupture by twisting when removed from the neck of the bottle by twisting and not by pulling alone, and giving good results both of elasticity and for homogeneity, and that they be made of two types of cork agglomerate which are closely bonded and produced from two ranges of granulates of different granulometry, in the following percentages:

a) 10 to 90%, by volume, preferably between 40 and 60%, by volume of Agglomerate 1, obtained from Granulate 1 of cork with granulometry between 2 and 10 mm, preferably between 3 and 7 mm;

b) 90 to 10%, by volume, preferably between 60 and 40% by volume of Agglomerate 2, obtained from Granulate 2 of cork of granulometry between 0.25 and 4 mm, preferably between 0.25 and 2.5 mm;

the joining surface between the two agglomerates being irregular due to their interpenetration and with Agglomerate 2 being in contact with the wine.

In other embodiments of the stoppers in accordance with this invention, the stoppers could also include one or more discs of natural cork at the lower and/or upper ends of the stopper.

A second object of the invention relates to the process for producing stoppers of composite material for sparkling wines in a bottle at pressures of more than 1.5 bar, characterised by doing the individual moulding of the stoppers by two types of cork agglomerate, closely bonded and produced from two ranges of granulates of different granulometry, in the following percentages:

a) 10 to 90%, by volume, preferably between 40 and 60%, by volume, of Agglomerate 1, obtained from Granulate 1 of cork with granulometry between 2 and 10 mm, preferably between 3 and 7 mm;

b) 90 to 10%, by volume, preferably between 60 and 40%, by volume, of Agglomerate 2, obtained from Granulate 2 of cork of granulometry between 0.25 and 4 mm, preferably between 0.25 and 2.5 mm.

Agglomerate 1 is obtained in an individual mixer 1 by making a specific formulation with granulate 1, a bonding agent and other additives, and agglomerate 2 is obtained in an individual mixer 2 by making a specific formulation with granulate 2, a bonding agent and other additives, each of them consisting of a previously validated volume and mass, the so called formulation, these raw materials being transferred to two separate systems, of variable dosage, and the mixtures thus produced are introduced into a system of pistons into a single moulding cavity, the cylindrical alveolus, fixed to the mould support plate at each of its ends.

Normally the lateral feeders consist of a rotating cylindrical or semi-cylindrical cavity which receives the granulate by gravity feed with the help of a vibrating agitation system, the granulate having been previously wetted with the additivated bonding agent.

The feeders are axially aligned with the moulding chamber and the compression piston slides inside the feeder pushing the granulate into the mould, and this operation happens simultaneously in the two tops of the cylindrical moulds where the granulates are then pressed.

The translation movement of the pistons ensures the compaction, the join line of the two types of agglomerate being an irregular line where there is some interpenetration of the two parts either side of the average conceptual line of separation.

Then the moulds are passed to a pre-heated and temperature controlled oven where they are kept for the necessary time for the polymerisation to occur and to ensure the mechanical stability to allow for the de-moulding, after cooling, without excessive expansion.

Then the moulds pass to a temperature controlled cooling chamber, and are cooled to a temperature of between 30 and 80° C., preferably 40 to 60° C., where they are de-moulded by piston ejector.

The close bond between the two types of agglomerate is ensured by the liquid polymerizable bonding agent.

The bonding agents used may be different for each of the types of agglomerate.

The formulations used may also be different for each of the types of agglomerate.

The close bond between the two types of agglomerate is guaranteed under pressure inside the mould.

Preferably, the liquid polymerizable bonding agent is to have a macro-molecular polyurethane structure, with or without reactive functionality.

Greater preference is given to the fact that the polyurethane prepolymer used in the agglomerate of the base is precursor of the bonding agent, has the terminal molecular structure derived from 4,4'-diphenylmethane diisocyanate (MDI) and the respective polymeric analogs, or derived from toluene diisocyanate (TDI), from its isomers or analogos.

The process in accordance with the invention allows the fabrication of more resistant stoppers made from two different agglomerated structures which are closely bonded, and which are resistant to rupture by twisting when removed from the neck of the bottle by and not just by pulling, and which show good results both in terms of elasticity and homogeneity.

Experimental Part

The feeder system consists of two independent granulate mixing circuits for the bonding agent and other additives which ensure equal dosing of the quantity to be introduced into the mould.

Each of these systems can be fed with granulates (rough and fine) and bonding agents with different characteristics, as well as different additives.

The two specific formulations are prepared in the two individual mixers (type of granulate, bonding agent and other additives, consisting of a volume and weight previously validated to the so called formulation) and these raw materials are transferred to two separate systems of variable dosage. The mixtures thus produced are then introduced by a system of pistons into a single mould cavity (cylindrical alveolus, fixed to the mould support plate) at each of its ends.

Each of the lateral feeders consist of a rotating cylindrical or semi-cylindrical cavity which receives the granulate by gravity feed with the help of a vibrating agitation system, the granulate having been previously wetted with bonding agent additive. The feeders are then axially aligned with the moulding chamber. The compression piston slides inside the feeder pushing the granulate into the mould.

This operation happens simultaneously in the two tops of the cylindrical moulds. The granulates are then pressed into the mould until there is a reduction of volume of 6 to 1. This may vary up to 3 to 1, or preferably from 4 to 1.

The unfinished stopper is thus made up of different granulates in each of the tops. The reason for the dosed quantities in each of the sides allows the variation of the length of each of the types of unfinished agglomerate stopper, with each stopper always consisting of two different types of granulates.

The sliding movement of the pistons is not to ensure the mixing of the granulates, but rather to ensure the compacting with the joint line of the two types of agglomerate being irregular with some interpenetration between the parts.

The unfinished stopper of agglomerated cork is thus formed inside the mould of two distinct types of agglomerates but which is tightly bonded.

The production process described allows the variation in a controlled manner and continuous of the relative proportion of each of the types of agglomerate from 10 to 90%, preferably from 40 to 60%.

After the closing of the moulds they pass into a pre-heated and temperature controlled oven where they are kept for the necessary time for the polymerisation to occur and to ensure the mechanical stability, after having been cooled, to allow de-moulding without excessive expansion.

The moulds then pass through a cooling chamber at a controlled temperature, and are cooled to a temperature of 30 to 80° C., preferably from 40 to 60° C. They are then removed from the moulds by means of a piston ejector. The complete cycle, from the introduction of the granulation to the extraction of the cylindrical body, takes from 30 to 80 minutes, preferably from 40 to 70 minutes.

The unfinished stoppers obtained are then stored for a sufficient time to allow full polymerisation. This interval of time can vary between 12 and 168 hours, preferably between 24 and 72 hours depending on the ambient temperature and relative humidity.

They are then machined to the intended dimensions and may or may not be washed, and in this case are subsequently dried. The stoppers thus obtained may have customised markings after conventional surface treatment.

The stoppers fabricated in accordance with the invention process described have the following advantages:

- Homogeneity of physical characteristics which allow excellent repeatability of behaviour and mechanics in regard to elasticity, as well as efficacy of specificity in application. This allows the benefits to be obtained from a constancy of pressure necessary for bottling because of this repeatability of the mechanical characteristics.
- Exterior visual aspect, after bottling identical to that of a traditional stopper and the more consistent "mushroom" shape on opening the bottle than with a traditional stopper.
- Homogeneity of organoleptic behaviour resulting from a better mastery of the technologies relating to the raw materials used.

The Examples and Comparative Studies which follow are to illustrate invention, but are not intended to limit it to that. There are obvious possible alterations which experts of the field could make provided that they do not diverge from the spirit and scope of this invention.

EXAMPLE 1

Production of Stoppers in Accordance with the Invention

In mixer 1 we introduce 16 kg of granulate 1 (with granulometry of between 3 and 7 mm), 2 kg of bonding agent 1 and 0.1 kg of additive 1, whilst in mixer 2 we introduce 12 kg of granulate 2 (with granulometry of between 0.5 mm and 2.5 mm), 2.5 kg of bonding agent 2, and 0.2 kg of additive 2. The mixture of the components is made in each of the mixers for 15 minutes. As this operation is discontinuous and the following ones are continuous, the mixing time has to be approximately the same as that in which the mixture is used. The dosage system then sequentially fills the volumes and this operation takes about 2.5 seconds.

The piston on each of the sides of the cylindrical mould transfers the granulate into the mould, and this transfer is done simultaneously through the two tops.

The volume of the dosage receptacles thus ensures that the maximum necessary compacting occurs during the two movements, and this operation takes about 4.5 seconds. The moulds rack then remains in the oven at a temperature of 120° C. for about 35 minutes. The moulds rack then passes into a cooling chamber set to a temperature of 65° C. and this takes about 15 minutes. The total time in the two ovens is therefore of the order of 50 minutes, and this is the designated total time of the "cycle".

EXAMPLE 2

| Characteristics of the Stopper obtained through the process of this invention | |
|---|---|
| Length (mm) | 48.0 ± 0.5 |
| Diameter (mm) | 30.5 ± 0.3 |
| Apparent specific mass (k/m$^3$) | 275 ± 20 |
| Length, fine grain (0.25 to 2.5 mm) composite agglomerate | 25.0 ± 2.0 |
| Length, Traditional grain (3 to 7 mm) composite agglomerate | 23.0 ± 2.0 |

This example was chosen because the length of the fine grain agglomerated composite to be in contact with the wine corresponds to the known depth of sealing for sealing gassy drinks.

Comparative Studies of Stoppers Made Through this Invention with Stoppers from Previous Techniques Presented below is a comparison of the physical characteristics between stoppers produced in accordance with the invention process, and those produced by traditional processes (from 3 to 7 mm granulation): moulded agglomerates, agglomerates with two discs bonded to the same end and new generation agglomerates (produced from granulation from 0.3 to 1.2).

All these stoppers have similar characteristics of size, volume and weight.

Elasticity was measured with the aid of the relation of compression force to relaxation force. These figures for force were obtained from the methodology contained in the Norm ISO 9727.

Also measured was the instantaneous compression strength required to compress the stopper from its initial diameter of 30.5 mm to 15 mm (compression diameter at the time of bottling).

Measurement was taken of the force applied by the stopper one minute after having gone from 15 mm to 17.5 mm (diameter of the base of the necks of champagne and sparkling wine bottles). The lower the relation $F_{comp/Frecov}$ is, the better the mechanical properties of the agglomerated cork are, as this means that it can be compressed, and will preserve good recovery strength which is absolutely necessary for good sealing.

$F_{comp}$—Compression strength
$F_{recov}$—Recovery strength (Residual elastic strength)
Comparative tests carried out show the following results:

| Elasticity | |
|---|---|
| Stopper produced in accordance with the process of the invention | 1.23 ± 0.02 |
| Moulded agglomerate stopper | 1.32 ± 0.29 |
| Agglomerate stopper with two discs | 1.24 ± 0.13 |
| New generation fine grain agglomerate stopper | 1.30 ± 0.10 |

Thus we observed that the stopper obtained through the invention process showed better results regarding the level of elasticity as well as homogeneity in the test results.

Resistance to the rupture when twisted is also a fundamental parameter for a stopper which will be drawn from the neck of the bottle by twisting and not simply by pulling. This action is tested by using a machine designed for such tests. The higher the binary value at which the rupture occurs, the more resistant was the stopper being tested. The following results were obtained:

| Rupture Binary (N.m) | |
|---|---|
| Stopper produced in accordance with the process of invention | 49.9 ± 3.5 |
| Moulded agglomerate stopper | 41.9 ± 3.8 |
| Agglomerate stopper with two discs | 44.1 ± 3.8 |
| New generation fine grain agglomerate stopper | 46.2 ± 3.7 |

Thus, it was noted that the stopper produced in accordance with the invention process presented better and more homogenous results.

It was also verified that the rupture from twisting occurred in a random manner, as much in the fine agglomerate composite as in that of traditional agglomerate. In both cases there were no significant differences.

No rupture in the stopper was detected along the theoretical join line between the two types of agglomerate.

The invention claimed is:
1. A process for the production of stoppers of composite material for sparkling wines in bottles at a pressure of more than 1.5 bar, characterised in that it comprises:
   individual moulding and partial interpenetration of separate portions of the stoppers, each portion consisting of a cork agglomerate, closely bonded and produced from granulates of different granulometry,
   a first portion being 10 to 90% by volume of the stopper and comprising a first agglomerate, obtained from a first granulate of cork with granulometry of between 2 and 10 mm;

a second portion being 90 to 10% by volume of the stopper and comprising a second agglomerate, obtained from a second granulate of cork with granulometry of between 0.25 and 4 mm, wherein the first agglomerate and the second agglomerate are supplied to a single mould through two separate feeder systems.

2. The process in accordance with claim 1, characterised in that the first agglomerate is obtained in an individual mixer by making a specific formulation with the first granulate, a bonding agent and other additives and the second agglomerate is obtained in an individual mixer by making a specific formulation with the second granulate, a bonding agent and other additives, each of them consisting of a previously validated volume and mass called formulation, these raw materials being transferred to the two separate feeder systems, of variable dosage, and the mixtures thus produced are introduced into opposing ends of a single moulding cavity in the single mould.

3. The process in accordance with claim 2, characterised in that each of the two separate systems includes a lateral feeder that consists of a rotating cylindrical or semi-cylindrical cavity which receives the respective granulate by gravity feed with the help of a vibrating agitation system, the granulate having been previously wetted with the bonding agent.

4. The process in accordance with claim 3, characterised in that the feeders are axially aligned with the moulding cavity and include respective compression pistons that slide inside the feeder pushing the granulate into the respective opposing ends of the single moulding cavity, where the granulates are then pressed.

5. The process in accordance with claim 1, characterised in that the movement of the pistons ensures compaction of the two types of agglomerates and interpenetration of the granulates of the two types of agglomerates at an interface region, the interface region of the two types of agglomerate being irregular due to variable interpenetration of the granulates of the two types of agglomerates.

6. The process in accordance with claim 1, characterised in that the single mould, after closure, passes to a pre-heated and temperature controlled oven, where it is kept for a necessary time for polymerisation to occur and to ensure mechanical stability to allow for de-moulding, after cooling, without excessive expansion.

7. The process in accordance with claim 6, characterised in that the mould passes to a cooling chamber at a controlled temperature, and is cooled to a temperature from 30 to 80° C., and is then de-moulded by means of a piston ejector.

8. The process in accordance with claim 6, characterised in that the mould is cooled to 40 to 60° C.

9. The process in accordance with claim 1, characterised in that a close bond between the two types of agglomerate is ensured by use of a liquid polymerisable bonding agent.

10. The process in accordance with claim 1, characterised in that bonding agents are used that can be different for each of the types of agglomerate.

11. The process in accordance with claim 1, characterised in that formulations used can be different for each of the types of agglomerate.

12. The process in accordance with claim 1, characterised in that a close bond between the two types of agglomerate are guaranteed under pressure inside the mould.

13. The process in accordance with claim 9, characterised in that the liquid polymerizable bonding agent has a macromolecular polyurethane structure, with or without reactive functionality.

14. The process in accordance with claim 13, characterised in that a polyurethane prepolymer is used in the agglomerate and is a precursor of the bonding agent, has a terminal molecular structure derived from 4,4'-diphenylmethane diisocyanate (MDI) and respective polymeric analogs, or is derived from toluene diisocyanate (TDI), from its isomers or analogs.

15. A process for the production of an elastic stopper made of composite material and suitable for sealing sparkling wines in a bottle at a pressure of more than 1.5 bar, comprising:

mixing a first cork granulate and a bonding agent in a first system to create a first type agglomerate;

mixing a second cork granulate and a bonding agent in a second system to create a second type agglomerate that is different from the first type agglomerate;

supplying the two types of agglomerate to a common moulding chamber through respective separate feeder systems;

compressing the two types of agglomerate in the common mould such that each agglomerate is compressed and the granulates of the two types of agglomerates interpenetrate at an interface region.

16. The process in accordance with claim 15, further comprising heating the mould with the compressed agglomerates at a temperature sufficient for polymerization and maintaining the mould at said temperature for a duration sufficient for the polymerisation to occur and to ensure the mechanical stability to allow for the de-moulding, after cooling, without excessive expansion.

17. The process in accordance with claim 16, further comprising cooling the mould with polymerized agglomerates at a controlled temperature within a range of 30 to 80° C.

18. The process in accordance with claim 17, further comprising de-moulding the cooled material with a piston ejector.

19. The process in accordance with claim 15, wherein each of the first system and second system a previously validated volume and mass of raw materials is separately transferred to the respective feeder systems for supply to the mould.

20. The process in accordance with claim 2, wherein each of the lateral feeders is axially aligned with the moulding chamber and a feeding of the first and second agglomerates into and the compressing of the first and second agglomerates in the mould occurs simultaneously.

* * * * *